No. 686,870. Patented Nov. 19, 1901.
W. L. WALTON.
DEVICE FOR STARTING EXPLOSIVE ENGINES.
(Application filed Dec. 19, 1900.)

(No Model.) 2 Sheets—Sheet 1.

Witnesses W. L. Walton, Inventor.

Attorneys.

No. 686,870. Patented Nov. 19, 1901.
W. L. WALTON.
DEVICE FOR STARTING EXPLOSIVE ENGINES.
(Application filed Dec. 19, 1900.)
(No Model.) 2 Sheets—Sheet 2.

Witnesses
James F. Crown.
Scott Chandlee.

W. L. Walton, Inventor
by C. A. Snow & Co.
Attorneys

UNITED STATES PATENT OFFICE.

WILLIAM L. WALTON, OF NECHE, NORTH DAKOTA.

DEVICE FOR STARTING EXPLOSIVE-ENGINES.

SPECIFICATION forming part of Letters Patent No. 686,870, dated November 19, 1901.

Application filed December 19, 1900. Serial No. 40,445. (No model.)

*To all whom it may concern:*

Be it known that I, WILLIAM L. WALTON, a citizen of the United States, residing at Neche, in the county of Pembina and State of North Dakota, have invented a new and useful Device for Starting Explosive-Engines, of which the following is a specification.

This invention relates to means for insuring proper ignition of the charges in a gas-engine during the time that the engine is acquiring that speed that is necessary to operate the igniting-dynamo at the necessary speed; and it has for its object to provide in combination with the engine and the dynamo a spring-actuated motor so constructed that it will operate the dynamo with the required speed until the proper speed of the engine has been attained, after which the power of the motor will be shifted off and the power from the engine shifted on to continue the rotation of the dynamo, these several shifting movements being automatic in every particular.

Figure 1:
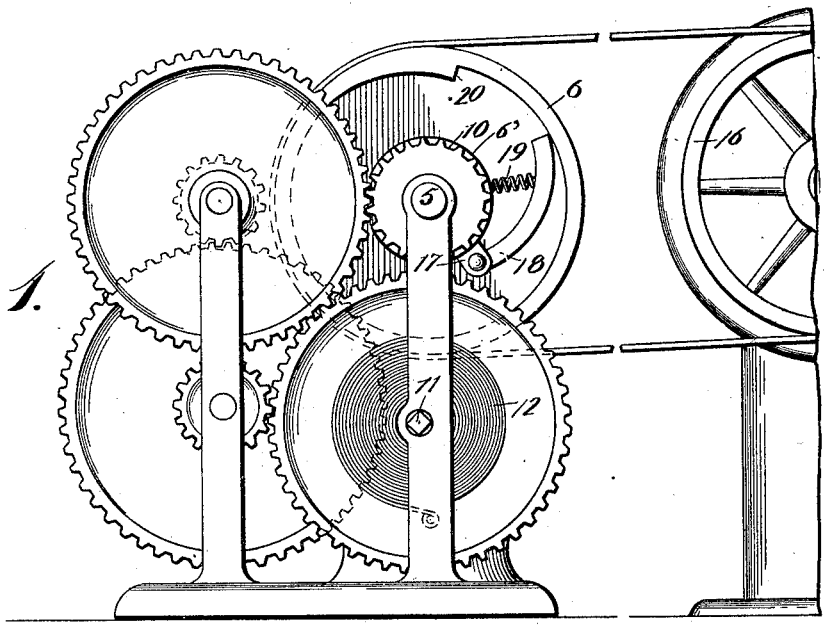
Figure 2:
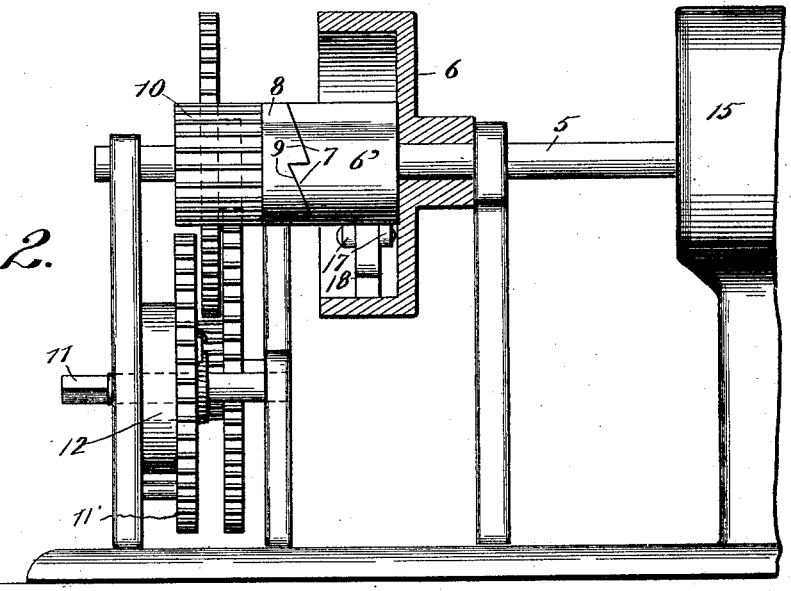
Figure 3:
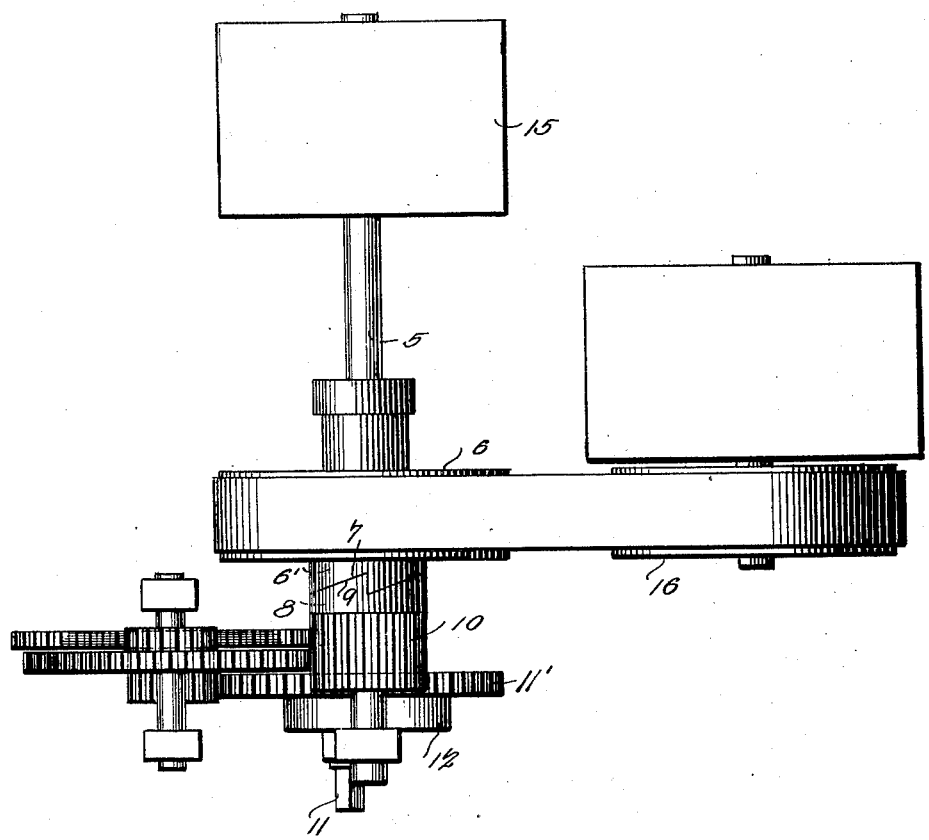

In the drawings forming a portion of this specification, and in which like numerals of reference indicate similar parts in the several views, Figure 1 is an elevation showing the motor connected up with the engine and dynamo. Fig. 2 is a side elevation looking to the left and showing the belt-pulley in section with the clutch members in elevation.

Referring now to the drawings, the present apparatus comprises a main driving-shaft 5, which may be the dynamo-shaft or may be coupled thereto, and from which shaft the dynamo is driven. On the shaft 5 is mounted loosely a belt-pulley 6, which is hollow, as shown, and within the inclosure of which and fixed upon the shaft 5 is a clutch member 6', having clutching-teeth 7, which are directed in a direction opposite to that of rotation of the shaft 5.

Mounted slidably on the shaft 5 and adapted to rotate freely thereon is a second clutch member 8, having teeth 9 at one end which are directed forwardly and are adapted for engagement with the teeth 7 of the member 6' referred to above. This second clutch member is adapted for longitudinal movement into and out of engagement with the first member and may be moved into engaging position by pressure applied to the outer end thereof.

At the end of the clutch member 8, opposite to the teeth 9 thereof, there are formed longitudinally-extending gear-teeth 10, which form, in effect, a pinion, and this pinion forms one end of a train of gearing, terminating at its opposite end in a shaft 11, upon which is disposed a spring 12, the shaft being squared to receive a common form of winding-key for winding up the spring.

The spring 12 is so disposed and the different gears of the train are so combined that as the spring unwinds it communicates a high rate of speed to the pinion on the shaft 5 and rotates this pinion in the direction of projection of the teeth 9. Thus if the second clutch member be moved to engage its teeth with those of the first clutch member and the motor be then operated under the influence of its spring the first clutch member will be rotated, and therewith the shaft 5 and the armature of the dynamo 15, this speed of rotation of the dynamo-armature being sufficient to accomplish ignition of the charges in the gas-engine, which is indicated at 16.

Upon the periphery of the clutch member 6' there are formed spaced ears 17, and between these ears there is pivoted one end of a pawl 18, the free end of which is held yieldably in contact with the inner surface of the pulley-wheel 6 by means of a helical spring 19, and projecting inwardly from the inner face of this pulley-wheel is a lug 20. The apparatus is connected with the engine by bringing a belt 21 from the engine to the pulley-wheel 6 and in such manner that the engine will drive the pulley in the direction of operative movement of the shaft 5. Therefore when the speed of the engine has reached that point where it will drive the pulley 6 at a higher speed than it is driven by the spring-motor, then the lug 20 will catch up with the pawl, and through the medium of the pawl the pulley will rotate the clutch member 6', and therewith the shaft 5. When the clutch member 6' rotates faster than the member 8, then the teeth of the two members have a mutual wedging action, with the result that the member 8 is moved longitudinally until its teeth are entirely free from the teeth 7, and the member 8 continues to rotate by action of the spring until the spring is entirely run down. The longitudinal extent of the gear-teeth 10 permits this movement of the member 8 to disengage its teeth from the teeth 7. It will be understood that when the engine is to be started the members 6' and 8 are first engaged, and the winding-key having been applied to the shaft 11 said shaft is quickly rotated a sufficient number of times to wind up the spring, the outer end of the spring being fixed, as shown, and the inner end thereof being attached to the shaft, which latter has a pawl-and-ratchet connection with the gear 11' of the train, and which gear is mounted loosely on the shaft. When the winding of the spring is at an end, the spring-motor immediately begins to operate to rotate the dynamo, and, as above stated, when thrown out of connection with the dynamo the spring runs down. It will be thus seen that the motor is automatically thrown out of operative connection with the shaft 5 and the engine is automatically thrown in when the speed of the engine has reached the proper point.

It will be understood that in practice various modifications of the specific construction shown may be made and that any suitable materials and proportions may be used for the various parts without departing from the spirit of the invention.

What is claimed is—

1. A device of the class described comprising a drive-shaft adapted for connection with a starting-dynamo to operate it and having a pulley mounted loosely thereon adapted to receive a belt from an engine to be started, a clutch member fixed on the shaft, a pawl carried by the clutch member for engagement with the pulley, a second clutch member adapted for engagement with the first clutch member, and means independent of the engine to be started for rotating the second clutch member to rotate the first clutch member and the shaft in the same direction as rotated from the pulley-wheel, said clutch member being constructed and arranged for movement out of engagement when the speed of the shaft exceeds the speed of the second clutch member.

2. A device of the class described comprising a drive-shaft for operating an igniting-dynamo, a pulley mounted loosely on the shaft for operation from a gas-engine to be started, a clutch member fixed on the shaft, pawl-and-ratchet connection between the pulley and clutch member for rotating the member from the pulley, a second clutch member movable into and out of engagement with the first clutch member, and means independent of the engine to be started for rotating the second clutch member in the same direction as is the first clutch member under the influence of the pulley.

3. The combination with a gas-engine and an igniting-dynamo, of a motor independent of the engine for operating the dynamo at a given speed, connections between the engine and dynamo, means for automatically throwing the motor out of operative relation to the dynamo and means for throwing the engine into operative relation to the dynamo when the engine has reached a predetermined speed.

4. The combination with a gas-engine and an igniting-dynamo, of a motor independent of the engine for operating the dynamo at a given speed, means operably connected with the engine, for throwing the dynamo out of operative relation to the motor and separate means operably connected with the engine for throwing the dynamo into operative relation to the engine, when the speed of the engine delivered to the dynamo is greater than the speed delivered by the motor.

In testimony that I claim the foregoing as my own I have hereto affixed my signature in the presence of two witnesses.

WILLIAM L. WALTON.

Witnesses:
D. MALE,
J. E. HOOGAN.